United States Patent [19]

Hofman

[11] Patent Number: 4,680,521

[45] Date of Patent: Jul. 14, 1987

[54] STABILIZATION AID FOR A VEHICLE- OR VESSEL-BORNE SEARCH UNIT

[76] Inventor: Jan Hofman, Haarboerhorst 21, Enschede, Netherlands

[21] Appl. No.: 842,765

[22] Filed: Mar. 21, 1986

Related U.S. Application Data

[63] Continuation of Ser. No. 542,838, Oct. 17, 1983.

[30] Foreign Application Priority Data

Oct. 19, 1982 [NL] Netherlands ............... 8204027

[51] Int. Cl.$^4$ .................. B64C 17/06; H01Q 1/34
[52] U.S. Cl. ................... 318/649; 318/588; 318/611; 318/632; 364/164; 343/766
[58] Field of Search ........... 318/648, 649, 713, 58, 318/588

[56] References Cited

U.S. PATENT DOCUMENTS

| | | | |
|---|---|---|---|
| 3,358,285 | 12/1967 | Van der Wal | 343/709 |
| 3,741,474 | 6/1973 | Kawada | 318/588 X |
| 3,832,609 | 8/1974 | Barrett | 318/52 |
| 4,035,698 | 7/1977 | Soderberg | 318/52 |
| 4,136,303 | 1/1979 | Almquist | 318/52 |
| 4,143,312 | 3/1979 | Duckworth | 318/649 |
| 4,156,241 | 5/1979 | Mobley | 318/649 X |
| 4,278,927 | 7/1981 | Grohe | 318/648 X |
| 4,336,594 | 6/1982 | Masuzawa | 318/588 X |
| 4,382,216 | 5/1983 | Joseph | 318/648 X |
| 4,418,306 | 11/1983 | Samsel | 318/648 |

Primary Examiner—William M. Shoop, Jr.
Assistant Examiner—Patrick C. Keane
Attorney, Agent, or Firm—Thomas A. Briddy

[57] ABSTRACT

A stabilization aid for a vehicle- or vessel-borne search unit comprises two servomechanisms for stabilizing the observation part (3) of the search unit about two mutually perpendicular axes ($S_1$ and $S_2$) mounted on the part of the search unit which rotates about the search axis (1). The stabilization aid comprises a computer (7) for determining, from the instantaneous angle of inclination ($\alpha$) of the platform (2) supporting the search unit with respect to an earth-fixed reference axis and the instantaneous angular position (B) of the search unit about the search axis (1), measured in the plane of the platform (2), input signals for the servomechanisms. A portion of these input signals are compensating signals for the control errors in the servomechanisms. The principal causes of the control errors are the disturbing torques arising through the non-uniformity in the search motion and the rotational velocity of each of the stators with respect to the rotors of the servomechanism motors on their axes.

4 Claims, 2 Drawing Figures

STABILIZATION AID FOR A VEHICLE- OR VESSEL-BORNE SEARCH UNIT

This is a continuation of application Ser. No. 542,838, filed Oct. 17, 1983.

BACKGROUND OF THE INVENTION

The invention relates to a stabilization aid for a vehicle- or vessel-borne search unit. It is usual to mount such a unit on a platform on board the vehicle or vessel and to stabilize this platform with respect to the horizontal plane. If, in addition to the search unit, a tracking unit and opto-electronic observation means are mounted on the stabilized platform, this results in a heavy stabilization system through the added weight and weight distribution. In U.S. Pat. No. 3,358,285 this disadvantage is obviated by suspending the platform in a stabilized frame inside a radome, installing the tracking unit above the platform and the search unit below the plaform. Such a system has however the disadvantages that no opto-electronic observation means, not included in the search and tracking units, can be installed on the platform inside the radome, and that if the radome and hence the frame in which the platform is suspended undergo a substantial rolling motion, the view of the search unit is obstructed, giving rise to blind spots during the search process. The present invention has for its object to provide a completely different method of stabilization, whereby the above disadvantages are obviated.

SUMMARY OF THE INVENTION

According to the invention stabilization aid as set forth in the opening paragraph comprises a first and a second servomechanism for stabilising the observation part of the search unit about two mutually perpendicular axes ($S_1$ and $S_2$) mounted on the part of the search unit which rotates about the search axis. The observation part of the search unit is therefore stabilized separately. For the observation part a radar antenna system or a television or infrared camera can be used. The servomechanisms are of such a design that a search motion is obtainable in an earth-fixed horizontal or earth-fixed inclined plane, as well as in an inclined plane rotating about an earth-fixed axis.

BRIEF DESCRIPTION OF THE DRAWING

The invention will now be described more fully with reference to the accompanying drawing figures, of which.

DESCRIPTION OF THE PREFERRED EMBODIMENT

Figure 1:
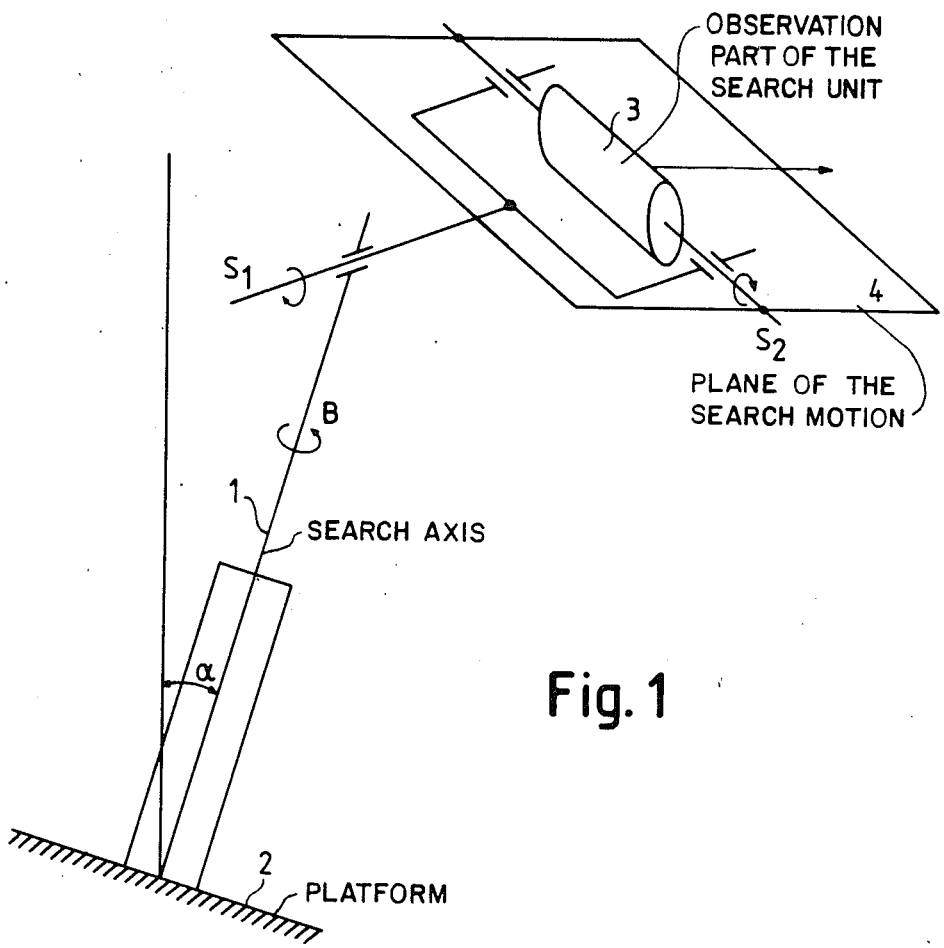
FIG. 1 is a schematic illustration of the various axes connected with the stabilization and the plane of stabilization, in which the search motion is performed.

In FIG. 1 the search axis of the search unit is designated by the numeral 1. The search unit is mounted on a platform 2; this platform is supported either directly by a vehicle or vessel, or by a rotable, vehicle- or vessel-borne support, but swings with the motion of the vehicle or vessel. The instantaneous angle of inclination of platform 2 with respect to an earth-fixed reference axis, e.g. the vertical, is designated by $\alpha$. On the part of the search unit rotating about search axis 1 are two mutually perpendicular axes $S_1$ and $S_2$, about which the observation part 3 of the search unit is rotable and stabilized. The observation part 3 of the search unit performs its search motion in a plane 4. The observation part 3 is stabilized such that the orientation of plane 4 is kept earth-fixed.

In case the search unit rotates on an inclined platform, a non-uniformity arises in the search motion. This non-uniformity causes a disturbing torque acting about axes $S_1$ and $S_2$. Assuming that the rotational velocity $\omega = \dot{B}$ of the observation part about axis 1 is constant and the plane 4 is normal to the vertical, the disturbing torque about axis $S_1$ may be expressed by the relationship:

$$M_s = \tfrac{1}{2}\tau\omega^2 \cdot \frac{\sin^3\alpha \cdot \cos\alpha}{(1 - \cos^2\omega t \cdot \sin^2\alpha)^2} \cdot (\sin\omega t + \sin 3\omega t),$$

where $\tau$ is the moment of inertia of the stabilized part of the search unit, i.e. of the observation part with suspension, about the $S_1$ stabilization axis concerned. The disturbing torque therefore comprises two frequency components. Apart from this disturbing torque arising through the non-uniformity in the search motion, other disturbing torques occur. The latter torques are however of a smaller magnitude, and include frictional torques, gyroscopic torques, due to the rolling rate of the platform, and wind torques.

All of these disturbing torques are a first cause of control errors in the servomechanisms. A second of such control errors lies in the rotational velocity of each of the stators with respect to the rotors of the servomechanism motors on axes $S_1$ and $S_2$. Since the orientation of plane 4 and therewith the above rotors are kept earth-fixed, the stators rotate about the respective rotors during the rotation of observation part 3 about the inclined rotation axis 1. So the disturbing angular velocity component $\dot{\phi}_s$ of the stators introduced by this rotation in the servomechanism at axis $S_1$ may be expressed by the relationship:

$$\dot{\phi}_s = \omega \cdot \frac{\sin\alpha \cdot \cos\alpha}{(1 - \cos^2\omega t \cdot \sin^2\alpha)} \cdot \cos\omega t.$$

The effect of the control errors produced by $M_s$ and $\dot{\phi}_s$ is that, although corrected for a defined earth-fixed, usually horizontal orientation, the plane 4 still assumes a position deviating from this orientation. Through the implementation of certain compensation methods however, it is possible to reduce the effect of the control errors drastically; notably the effect of the $\omega$-component of $M_s$ and $\dot{\phi}_s$ can be counteracted by applying feedforward control, dependent upon the $\alpha$ and B values, in the servomechanisms. With this control the plane is forced to stabilize in a position deviating from the desired orientation in such a way that, even with the occurrence of the above disturbances, stabilization in the desired plane is still realized. This compensation requires no additional motor torque if a direct driving motor is used. Compensation of the control errors caused by the $3\omega$-component of $M_s$ however requires an additional motor torque, as well as rather extensive calculations. Because the control errors caused by the $3\omega$-component are in practice of limited magnitude, they normally need not be compensated.

Figure 2:
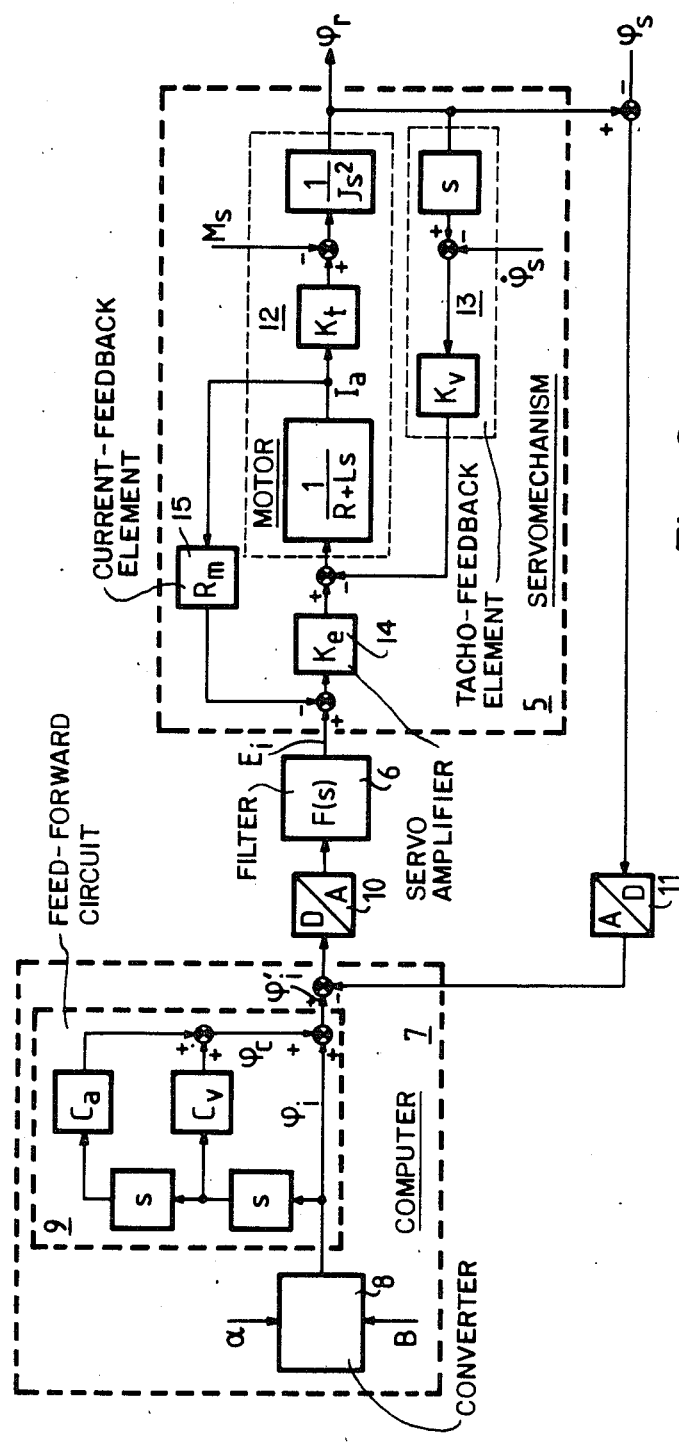
FIG. 2 is a block diagram of the stabilization aid according to the invention.

The block diagram of FIG. 2 illustrates the servomechanism 5 for one of the stabilization axes together with a feasible embodiment of the control error compensation means. The servomechanism 5 includes a motor 12, a tacho-feedback element 13, a servo amplifier 14 and a current feedback element 15. In addition to the control voltage $E_i$, the sum of the disturbing torques acts on the servomechanism 5. Of these torques, only the non-uniformity torque $M_s$ is taken into consideration. Further the stator rotation disturbance component $\dot{\phi}_s$, producing an electric counter-voltage, acts on the motor drive. In the embodiment in question the servo amplifier 14 comprises a current feedback circuit. The relationship between inputs $E_i$, $M_s$ and $\dot{\phi}_s$ on the one side and output $\phi_r$ of the servo amplifier-loaded motor combination on the other may be expressed by:

$$\phi_r = \frac{K_e E_i - \frac{R}{K_t}\left(1 + \frac{R_m K_e}{R}\right)\left[1 + \frac{s\tau_e}{\left(1 + \frac{R_m K_e}{R}\right)}\right] M_s + K_v \dot{\phi}_s}{K_v s \left[1 + \left(1 + \frac{R_m K_e}{R}\right) s\tau_m\right]\left[1 + \frac{s\tau_e}{\left(1 + \frac{R_m K_e}{R}\right)}\right]}$$

where $K_e$ is the forward gain of the servo amplifier, $K_t$ the motor torque constant, $R_m$ the current feedback constant, $R$ the motor armature resistance, $L$ the self-induction of the motor, $K_v$ the counter-voltage constant, $\tau_m = R\ /K_v K_t$ the mechanical time constant, and $\tau_e = L/R$ the electrical time constant, while $\tau_e < \tau_m$.

In a position feedback circuit, whose input signal is represented by $\phi_i'$ and where the angular difference $\phi_r$ between rotor and stator is fed back to the input, the relationship between $\phi_i'$, $M_s$ and $\dot{\phi}_s$ on the one side and $\phi_r$ on the other side is expressed by:

$$\phi_r = \frac{(\phi_i' + \phi_s) K_e F(s) - \frac{R_m K_e}{K_t}\left(1 + \frac{R}{R_m K_e} s\tau_e\right) M_s + K_v \dot{\phi}_s}{K_e F(s) + K_v s\left(1 + \frac{R_m K_e}{R} s\tau_m\right)\left(1 + \frac{R}{R_m K_e} s\tau_e\right)}$$

where $F(s)$ is the transfer function of the filter 6 in the feedforward circuit, while $R_m K_e / R > 1$.

To keep the required motor torque low, but without the control errors reaching extremely high values, and to prevent mechanical resonances in the desired lightweight and hence relatively weak construction, a relatively narrow servo bandwidth near the frequency range of the $M_s$ and $\dot{\phi}_s$ disturbances is utilized in the embodiment in question. This frequency range, in which $F(s) \simeq K_{\cdot} s$, where K is a constant, lies amply within the frequency interval $(R/R_m K_e \cdot 1/\tau_m, R_m K_e / R \cdot 1/\tau_e)$. If further $R_m K_v \tau_m / RK = 1/\omega_o$, the relationship between $\phi_i'$, $M_s$ and $\dot{\phi}_s$ on the one side and $\phi_r$ on the other may be approximated by $$\phi_r = \frac{1}{1 + \frac{s}{\omega_o}}\left[(\phi_i' + \phi_s) - \frac{1}{J\omega_o s}\left(M_s - \frac{K_v K_t}{R_m K_e} \dot{\phi}_s\right)\right]$$

With the rotation axis in the vertical position, $\phi_i' + \phi_s = 0$, $M_s = 0$ and $\dot{\phi}_s = 0$, so that $\phi_r = 0$. Plane 4 is therefore stabilized at the desired (horizontal) position about the axis considered. With the rotation axis in an inclined position, the control error within the frequency range in question equals:

$$\Delta\phi_r = \phi_i' + \phi_s - \phi_r =$$

$$\frac{1}{1 + \frac{s}{\omega_o}}\left[\frac{s}{\omega_o}(\phi_i' + \phi_s) + \frac{1}{J\omega_o s}\left(M_s - \frac{K_v K_t}{R_m K_e} \dot{\phi}_s\right)\right].$$

In order that plane 4 be stabilized at the desired value about the axis considered, the input signal $\phi_i'$ of the servomechanism consists of a signal $\phi_i$, representing the desired value at which the angular difference between rotor and stator of the axis concerned is controlled, and a compensation signal $\phi_c$ for the control errors incurred. This compensation signal is dependent upon the inclined position $\alpha$ of the platform and position B of the rotation axis measured in the plane of the platform: $\phi_c = F(\alpha, B) \simeq \Delta\phi_r$. A computer 7 supplies the input signal $\phi_i'$ of the servomechanism. This computer comprises a converter 8 and a feedforward circuit 9. In converter 8 the $\phi_i$ signal is obtained from the platform inclined position $\alpha$, measured with respect to an earth-fixed reference system, and position B of the search axis 1. The feedforward circuit 9 comprise a velocity feedforward depending upon the angular velocity, $c_v.\dot{\phi}_i$. A more precise control error compensation is obtained by also incorporating an acceleration feedforward depending upon the angular acceleration, $c_a.\ddot{\phi}_i$. In such a case, the compensation signal may be expresed by the relationship $\phi_c = (c_v + c_a s) s \phi_i$, where $c_v$ and $c_a$ are dependent upon $\alpha$ and $\dot{B}$ but may be assumed constant if the values of $\alpha$ and the variations of $\dot{B}$ incurred in practice are slight. A correct determination of $c_v$ and $c_a$ in computer 7 permits the $\omega$-component in $\Delta\phi_r$ to be compensated with high accuracy. As already stated, the $3\omega$-component need not be compensated. Hence, from the relationship between the measured values of $\alpha$ and B on the one hand and the angular correction $\phi_i$ on the other, the computer can calculate the instantaneous value of $\phi_c$ corresponding to can each instantaneous value of $\alpha$ and B. Alternatively, instead of a velocity and acceleration calculation for deriving the feedforward value of $\phi_c$, the computer can calculate each corrected value of $\phi_i$ from a fixed mathematical relationship or an experimentally determined relationship between $\alpha$ and B on the one hand and $\phi_c$ or $\Delta\phi_r$ on the other. For this purpose the computer may comprise, say, a memory containing for a series of $\alpha$ and B values the corresponding values for $\phi_c$.

FIG. 2 further illustrates a digital-to-analogue converter 10 and an analogue-to-digital converter 11 for providing the connections between the computer and the servomechanism. It should also be noted that in the disclosed embodiment the servomechanism is of electro-mechanical design; it is however also possible to utilize a hydraulic or pneumatic servo.

I claim:

1. A stabilization aid for a vehicle/vessel-borne search unit having an observation part mounted for continuous rotation about a search axis which is fixed with respect to the vehicle/vessel, said stabilization aid comprising:
   (a) first and second servomechanisms for moving the observation part about two mutually-perpendicular axes $S_1$ and $S_2$, respectively, and which are perpendicular to the search axis, to stabilize said observation part with respect to an earth-fixed reference axis;
   (b) means for measuring the angular velocity $\alpha$ of the observation part about the search axis and its angular position B relative thereto and for converting such measured values to signals $\phi_1$ for controlling each of the first and second servomechanisms to stabilize the observation part against variations in $\alpha$ and B;
   (c) a feed-forward circuit connected to said converting means for deriving from signals $\phi_i$ compensating signals $\phi_c$, each such compensating signal corresponding to the variations in the corresponding control signal $\phi_i$ due to changes in $\alpha$ and B;
   (d) and a computer for applying to each of the first and second servomechanisms for a signal $\phi'_i$ corresponding to the sum of the $\phi_i$ and $\phi_c$ signals for such servomechanisms, the $\phi'_i$ signals causing the servomechanisms to instantaneously compensate the observation part for disturbing torques caused by non-uniformities of motion thereof around the axes $S_1$ and $S_2$ due to inclination of the search axis with respect to the earth-fixed reference axis.

2. A stabilization aid as in claim 1, characterized in that the feed-forward circuit comprises, for each of the servomechanisms, means for deriving a velocity feedforward component of the compensating signal $\phi_c$ dependent upon the angular velocity of the $\phi_i$ signal for such servomechanism; and means for deriving an acceleration feedforward component of the compensating signal $\phi_c$ dependent upon the angular acceleration of the $\phi_i$ signal for such servomechanism.

3. A stabilization aid as in claim 1, characterized in that said computer comprises means for determining, from the instantaneous angle of inclination $\alpha$ and the instantaneous angular position B, the instantaneous values of $\phi_c$ from tabulations stored therein relating various values of $\alpha$ and B to corresponding values of $\phi_c$.

4. A stabilization aid as in claim 1, characterized in that each servomechanism comprises a position feedback combination including a servo-amplifier motor.

* * * * *

UNITED STATES PATENT AND TRADEMARK OFFICE
CERTIFICATE OF CORRECTION

PATENT NO. : 4,680,521
DATED : July 14, 1987
INVENTOR(S) : Jan Hofman

It is certified that error appears in the above-identified patent and that said Letters Patent is hereby corrected as shown below:

On the title page Insert

--(73) Assignee: Hollandse Signaalapparaten B.V.,
        The Netherlands --.

Signed and Sealed this

Tenth Day of May, 1988

*Attest:*

DONALD J. QUIGG

*Attesting Officer*    *Commissioner of Patents and Trademarks*